(12) United States Patent
Joos et al.

(10) Patent No.: US 10,843,301 B2
(45) Date of Patent: Nov. 24, 2020

(54) DEVICE AND METHOD FOR PROCESSING A FLEXIBLE SHEET

(71) Applicant: Securo B.V., Eindhoven (NL)

(72) Inventors: Stefaan Jules Lea Joos, Bertogne (BE); Franciscus Theodoras Verhoeven, Westerhoven (NL); Johannes Adrianus Maria Vernooij, Veghel (NL)

(73) Assignee: SECURO B.V., Eindhoven (NL)

( * ) Notice: Subject to any disclaimer, the term of this patent is extended or adjusted under 35 U.S.C. 154(b) by 395 days.

(21) Appl. No.: 15/741,566

(22) PCT Filed: Jul. 7, 2016

(86) PCT No.: PCT/NL2016/050494
§ 371 (c)(1),
(2) Date: Jan. 3, 2018

(87) PCT Pub. No.: WO2017/007319
PCT Pub. Date: Jan. 12, 2017

(65) Prior Publication Data
US 2018/0193964 A1    Jul. 12, 2018

(30) Foreign Application Priority Data
Jul. 7, 2015   (NL) ..................................... 2015103

(51) Int. Cl.
*B23K 37/04*   (2006.01)
*B23K 37/02*   (2006.01)
(Continued)

(52) U.S. Cl.
CPC .......... *B23K 37/0408* (2013.01); *B23K 26/38* (2013.01); *B23K 37/0235* (2013.01);
(Continued)

(58) Field of Classification Search
CPC ................ B23K 37/0408; B23K 26/38; B23K 37/0235; B26D 7/02; B26D 1/045;
(Continued)

(56) References Cited

U.S. PATENT DOCUMENTS

| | | | |
|---|---|---|---|
| 1,775,813 A | * | 9/1930 | Colby ................... B26F 1/3813 30/317 |
| 2,873,802 A | | 2/1959 | Frohlich et al. |

(Continued)

FOREIGN PATENT DOCUMENTS

| | | |
|---|---|---|
| EP | 2455184 A1 | 5/2012 |
| GB | 1365188 A | 8/1974 |

(Continued)

OTHER PUBLICATIONS

PCT International Search Report; PCT/NL2016/050494, dated Oct. 5, 2016.
(Continued)

*Primary Examiner* — Patrick M. Buechner

(57) ABSTRACT

A device for processing a flexible sheet includes a worktop for placement thereon of a flexible sheet to be processed. A processing device is provided above the worktop and a positioning device is provided for positioning the processing device on the flexible sheet and moving it along a straight processing line in the plane of the flexible sheet. The device also includes orientation device for setting the orientation of the processing line as desired.

14 Claims, 6 Drawing Sheets

(51) Int. Cl.
  *B26F 1/38*   (2006.01)
  *D06H 7/10*   (2006.01)
  *B26D 7/02*   (2006.01)
  *B26D 1/04*   (2006.01)
  *D06H 7/22*   (2006.01)
  *B23K 26/38*  (2014.01)
  *D06H 1/02*   (2006.01)
  *B26D 5/00*   (2006.01)
  *B26D 7/08*   (2006.01)

(52) U.S. Cl.
  CPC ............. *B26D 1/045* (2013.01); *B26D 7/02* (2013.01); *B26F 1/3813* (2013.01); *D06H 1/02* (2013.01); *D06H 7/10* (2013.01); *D06H 7/223* (2013.01); *B26D 5/005* (2013.01); *B26D 7/086* (2013.01)

(58) Field of Classification Search
  CPC ........ B26D 5/005; B26D 7/086; D06H 7/223; D06H 1/02; D06H 7/10; B26F 1/3813
  See application file for complete search history.

(56) References Cited

U.S. PATENT DOCUMENTS

| | | | | |
|---|---|---|---|---|
| 3,522,753 A * | 8/1970 | Schmied | ............... | B26F 1/3826 83/471.2 |
| 3,614,369 A * | 10/1971 | Medley | ................ | B26F 1/3813 83/18 |
| 3,766,813 A * | 10/1973 | Pearl | ................ | B26D 5/00 83/56 |
| 3,777,604 A * | 12/1973 | Gerber | ................... | B26D 7/018 83/374 |
| 3,841,187 A * | 10/1974 | Gerber | ................... | B26D 7/025 83/451 |
| 4,028,167 A * | 6/1977 | Gerber | ................... | B26D 7/27 156/384 |
| 4,133,234 A * | 1/1979 | Gerber | ................ | G05B 19/182 83/56 |
| 4,133,235 A * | 1/1979 | Gerber | ................... | B26D 5/00 83/74 |
| 4,140,037 A * | 2/1979 | Gerber | .................. | B26F 1/3813 83/56 |
| 4,200,015 A * | 4/1980 | Gerber | ................... | B26D 5/00 83/22 |
| 4,201,101 A * | 5/1980 | Gerber | ................... | B26D 5/00 83/174 |
| 4,327,615 A * | 5/1982 | Gerber | ................... | B26D 5/00 83/49 |
| 4,331,051 A * | 5/1982 | Gerber | ................... | B26D 5/00 83/74 |
| 4,364,330 A * | 12/1982 | Pearl | ................ | B26D 7/27 118/37 |
| 4,380,944 A * | 4/1983 | Gerber | ................... | B26D 5/00 83/49 |
| 4,419,820 A | 12/1983 | Stumpf | | |
| 4,485,712 A * | 12/1984 | Gerber | ................ | B25B 11/005 83/100 |
| 4,554,738 A * | 11/1985 | Barrett | ................ | B26F 1/3813 30/275 |
| 4,793,033 A * | 12/1988 | Schneider | ............. | D06C 23/02 26/16 |
| 4,802,349 A | 2/1989 | Jennrich et al. | | |
| 4,803,781 A * | 2/1989 | Jung | .................... | B26F 1/3813 30/275 |
| 5,042,338 A * | 8/1991 | Gerber | ................... | B26D 3/12 83/34 |
| 5,042,339 A * | 8/1991 | Gerber | ................... | B26D 5/005 83/49 |
| 5,163,008 A * | 11/1992 | Gerber | ................... | B26D 7/015 226/27 |
| 5,214,590 A * | 5/1993 | Schnetzer | ................ | B26F 1/38 700/171 |
| 5,216,614 A * | 6/1993 | Kuchta | .................... | B26D 5/00 700/134 |
| 5,508,936 A * | 4/1996 | King | ....................... | B26D 5/00 382/111 |
| 5,836,224 A * | 11/1998 | Gerber | ................... | B26D 7/018 83/22 |
| 2002/0002416 A1* | 1/2002 | Herman, Jr. | ............. | B26D 5/00 700/135 |
| 2003/0033047 A1* | 2/2003 | Rapoza | .................... | B26D 5/00 700/131 |
| 2011/0147347 A1* | 6/2011 | Maurer | ................. | B23K 26/38 219/121.18 |
| 2012/0262517 A1* | 10/2012 | Takaku | ............... | C09D 11/322 347/20 |
| 2014/0287207 A1* | 9/2014 | Okuyama | ............. | C09D 11/38 428/207 |
| 2015/0224600 A1* | 8/2015 | Spiess | ................ | B23K 37/0235 219/121.71 |
| 2016/0221204 A1* | 8/2016 | Jun | ....................... | B26D 7/2614 |
| 2016/0250718 A1* | 9/2016 | Tanahashi | .............. | B23K 26/10 219/121.8 |
| 2016/0256956 A1* | 9/2016 | Nagae | ................ | B23K 26/0884 |
| 2018/0086929 A1* | 3/2018 | Hayashi | ................ | C09D 11/38 |

FOREIGN PATENT DOCUMENTS

JP             63134280        *  6/1988    .......... B14M 5/0023
WO      WO2006072253 A1       7/2006

OTHER PUBLICATIONS

Written Opinion of the International Search Authority; PCT/NL2016/050494, dated Oct. 5, 2016.

* cited by examiner

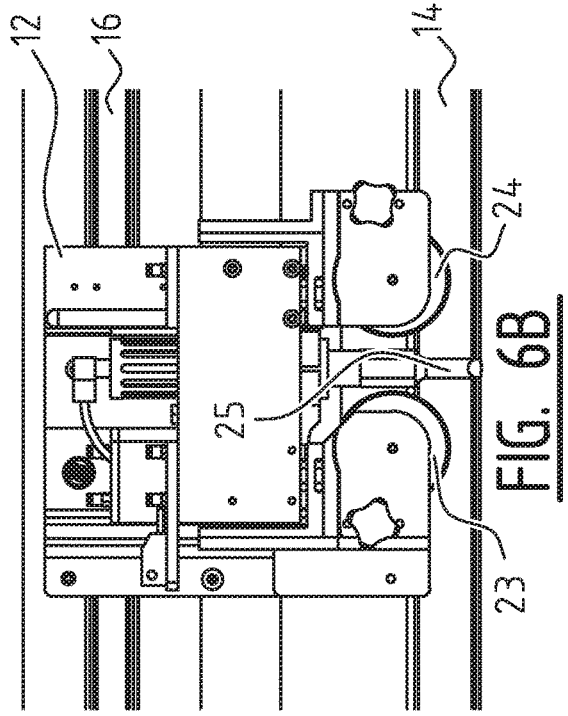
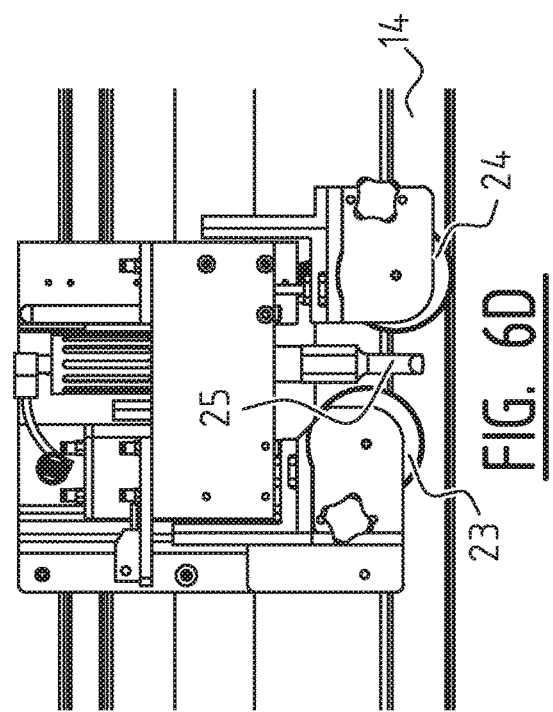
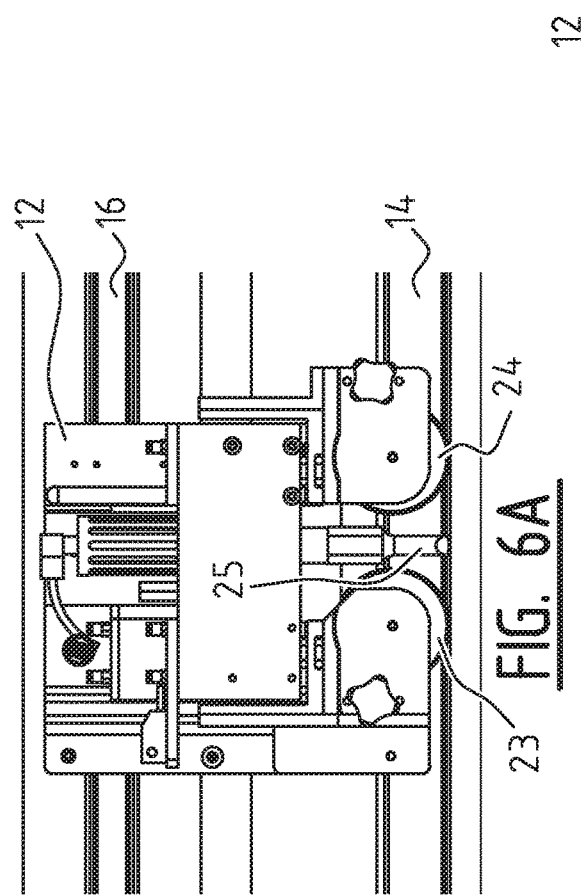
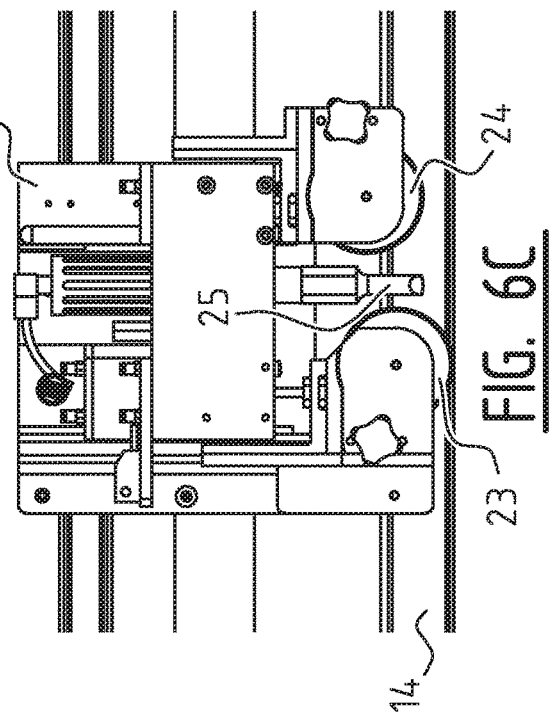

though understood that the term "flexible sheet" is understood to
DEVICE AND METHOD FOR PROCESSING A FLEXIBLE SHEET This is a national stage application filed under 35 U.S.C. 371 of pending international application PCT/NL2016/050494, filed Jul. 7, 2016, which claims priority to Netherlands patent application NL 2015103, filed Jul. 7, 2015, the entirety of which applications are incorporated by reference herein.

FIELD OF THE DISCLOSURE

The present invention relates to a device for processing a flexible sheet, comprising a worktop for placement thereon of a flexible sheet to be processed, a processing means provided above the worktop and positioning means for positioning the processing means on the flexible sheet and moving it along a straight processing line in the plane of the flexible sheet.

BACKGROUND OF THE DISCLOSURE

It is noted that the term "flexible sheet" is understood to mean any flexible material that extends in a thin plane, such as, but not exclusively, textile, fabric, tissue, nonwoven screen cloths and the like.

Such a device for processing a textile sheet, for example, is generally known. In the known device, the textile sheet is laid on a rectangular cutting surface and subsequently cut along straight cutting lines by a laser that is movable in the longitudinal direction and the transverse direction of the cutting table. The laser is positioned on the textile sheet in advance, and the textile sheet must be manually turned for enabling the laser to cut more complex cutting shapes.

A drawback of the known device is that manually turning the textile sheet of the laser so as to position the laser such that it will be able to cut these more complex cutting shapes is not only time-consuming and laborious, but also imprecise, with all its adverse consequences for the cutting shape in question.

SUMMARY OF THE DISCLOSURE

The object of the invention is to improve the prior art, more in particular to provide a device for processing a flexible sheet at a high speed and with great precision.

In order to achieve that object, a device of the kind described in the introduction is according to the invention characterised in that the device comprises orientation means for setting the orientation of the processing line as desired. In other words, using the orientation means it is possible to set the orientation of the processing line, i.e. the angle that the processing line includes with a longitudinal or transverse axis of the preferably rectangular or square worktop, as desired in advance. The orientation means in particular comprise a rotatable arm on which the processing means is mounted for movement in the longitudinal direction of the arm, wherein the arm extends in a plane at least substantially parallel to the upper surface of the worktop, being rotatable about an axis that extends at least substantially perpendicular thereto. The arm can preferably be rotated 360°. Thus it is possible to set any desired angle between the rotatable arm and the aforesaid longitudinal or transverse axis of the worktop in advance. The processing means can subsequently be moved along a straight processing line at the set angle in the plane of the flexible sheet without the flexible sheet itself first needing to be turned at that angle under the processing means. The invention makes it possible to cut also other shapes in the flexible sheet in a quick and precise manner, which shapes may or may not be complex, such as a trapezium shape or a parallelogram shape, for example, with less remaining waste than in the prior art.

It is noted that the processing means is in principle capable of carrying out any operation on the flexible sheet, but that within the scope of the invention the processing means is in particular a cutting means for making cuts in the flexible sheet so as to cut shapes from the flexible sheet.

The present device in particular comprises a touch screen for operating the device.

The worktop in particular has a longitudinal axis and a transverse axis, wherein the positioning means are provided with a cross beam or bridge, which can be moved forward and backward in the longitudinal direction of the worktop over at least part thereof, and wherein the arm can be moved forward and backward in the longitudinal direction of the cross beam.

In a preferred embodiment of a device according to the invention, a clamping means is provided on the side of the arm that faces the upper surface of the worktop for clamping the flexible sheet between said upper surface and the clamping means. The clamping means preferably comprises a clamping section extending along substantially the entire length of the arm, on either side of the processing means, which clamping means is movable in a direction at least substantially perpendicular to the upper surface of the worktop. The clamping section presses down the flexible sheet in the direct vicinity of the processing means, so that the flexible sheet can be processed with great precision without locally warping, for example. Because the arm is rotatable, preferably through 360°, about an axis that extends substantially perpendicular to the worktop, it is possible to clamp the flexible sheet at any desired angle between the rotatable arm and the aforesaid longitudinal or transverse axis of the worktop on the worktop using the clamping means. The processing means can then be moved in a straight processing line at the set angle in or parallel to the plane of the clamped flexible sheet. The flexible sheet itself need not first be turned to that angle under the processing means, nor does it need to be held in place, by being clamped or otherwise, on the sides thereof. Large clamping means that clamp the flexible sheet in position over its entire length and/or width are not needed, therefore. Thus, an arm and a clamping section provided thereon, which are both shorter in length than the length and the width of the flexible sheet, will suffice, whilst the clamping section clamps the flexible sheet in position in the direct vicinity of the processing means, so that the flexible sheet can be processed with precision without warping or being moved, for example, at the location where the processing takes place. As a result, both the arm and the clamping means are relatively compact, so that the processing of the flexible sheet, whether or not into complex shapes, can take place quickly and precisely. If a rectilinear operation needs to be carried out along a length greater than that of the arm and the clamping section provided thereon, the operation will be divided into several short sub-operations according to the length of the arm and the clamping section, wherein preferably the processing means is held in position on or above the flexible sheet between two sub-operations and the arm is moved relative to the processing means, such that a straight first sub-operation can be continued in a next straight sub-operation in the extension thereof from the exact position where the first sub-operation was completed. It is noted that the flexible sheet need not necessarily be larger. If the flexible sheet is smaller, the arm, also called clamping beam, need not reposition itself during a rectilinear operation.

In another preferred embodiment of a device according to the invention, the processing means comprises several cutting means to be selected as desired, in particular pressure cutting means of varying sharpness, an ultrasonic frequency pulsed cutting means and a laser cutting means. Ultrasonic cutting is generally used for cutting textile, for example. Because of the high frequency at which the cutting head pulses, energy is transferred to the textile, thus generating heat. As a result, melting of the cutting edge takes place during cutting, so that the risk of fraying of the cutting edge is significantly reduced. This leads to a neat cutting edge of the textile, so that the cutting edge needs no further finishing. Laser cutting is also used for cutting textile. The advantage of laser cutting is that with this type of cutting there is no contact with the textile, the textile is locally melted so as to realise a clean and smooth cutting edge of the textile. According to the invention a specific cutting means can be selected in advance, for example in dependence on the material of the flexible sheet, and be positioned for cutting the flexible sheet.

In another preferred embodiment of a device according to the invention, at least the upper surface of the worktop comprises suction means and/or is made of hardened steel. The suction means provide an underpressure, causing the flexible sheet to be pressed firmly against the worktop, which enhances the precision of the processing.

In another preferred embodiment of a device according to the invention, the invention further comprises clamping means provided on the arm for gripping the flexible sheet and subsequently placing the flexible sheet on the worktop using the positioning means.

In another preferred embodiment of a device according to the invention, the device comprises a marking means for drawing position marks and/or patterns on the flexible sheet, in particular in view of subsequent processing steps to be carried out on the flexible sheet. The marking element preferably comprises a cartridge with ink that lights up in ultraviolet light.

The invention also relates to a method for processing a flexible sheet, comprising the following steps:
  placing a flexible sheet on a worktop;
  providing a processing means;
  positioning the processing means on the flexible sheet;
  processing the flexible sheet along a straight processing line in the plane of the flexible sheet using the processing means; characterised by
  setting the orientation of the processing line.

In a preferred embodiment of a method according to the invention, the method comprises the step of clamping the flexible sheet between the upper surface of the worktop and a clamping means provided on the processing means.

In another preferred embodiment of a method according to the invention, the processing of the flexible sheet comprises the cutting of the flexible sheet.

In another preferred embodiment of a method according to the invention, the method comprises at least one of the following steps:
  gripping the flexible sheet and subsequently placing it on the worktop;
  drawing position marks and/or patterns on the flexible sheet.

The invention also relates to a computer program comprising instructions to be executed on a computer for carrying out the method according to the invention.

BRIEF DESCRIPTION OF THE DRAWINGS

The invention will now be explained in more detail with reference to figures illustrated in a drawing, in which:

FIGS. 6A through 6D are side views showing various positionings of the device of FIG. 1.

DETAILED DESCRIPTION

Figure 1:
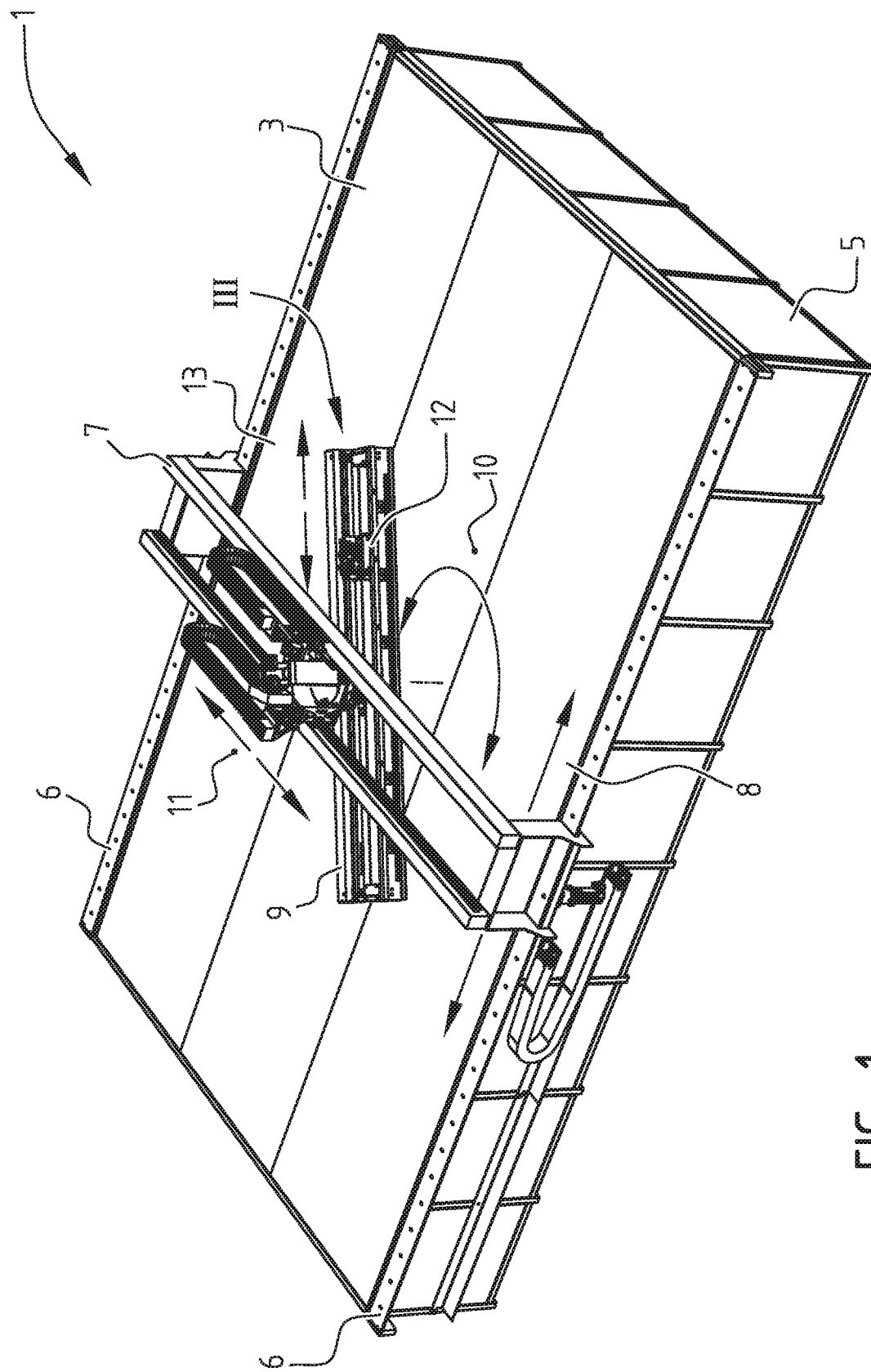
FIG. 1 is a schematic, perspective view of a preferred variant of a device according to the invention for cutting a flexible sheet.
Figure 2:
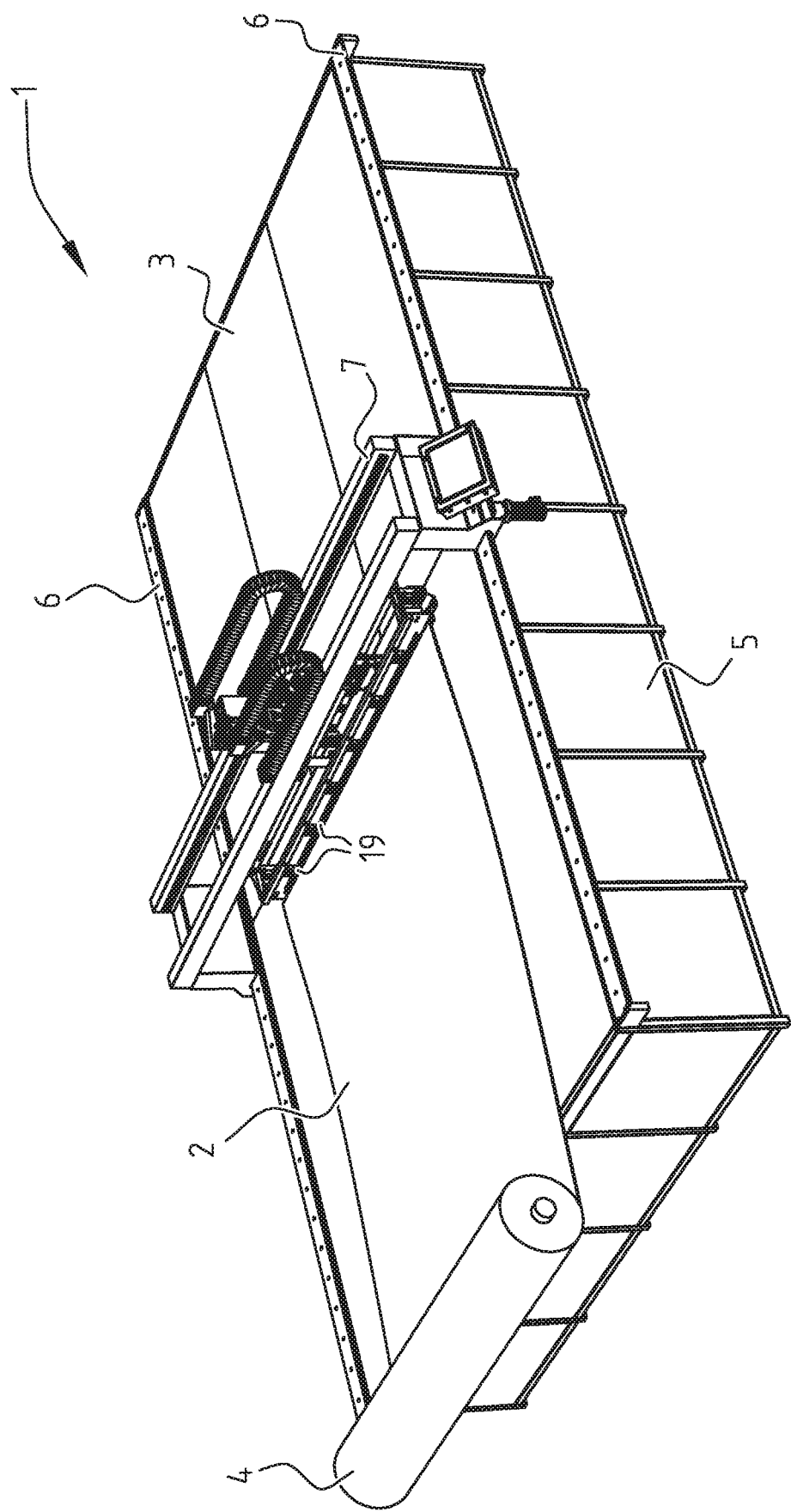
FIG. 2 is a view corresponding to FIG. 1, but wherein a flexible sheet is drawn onto a worktop from a feed roll.
Figure 3:
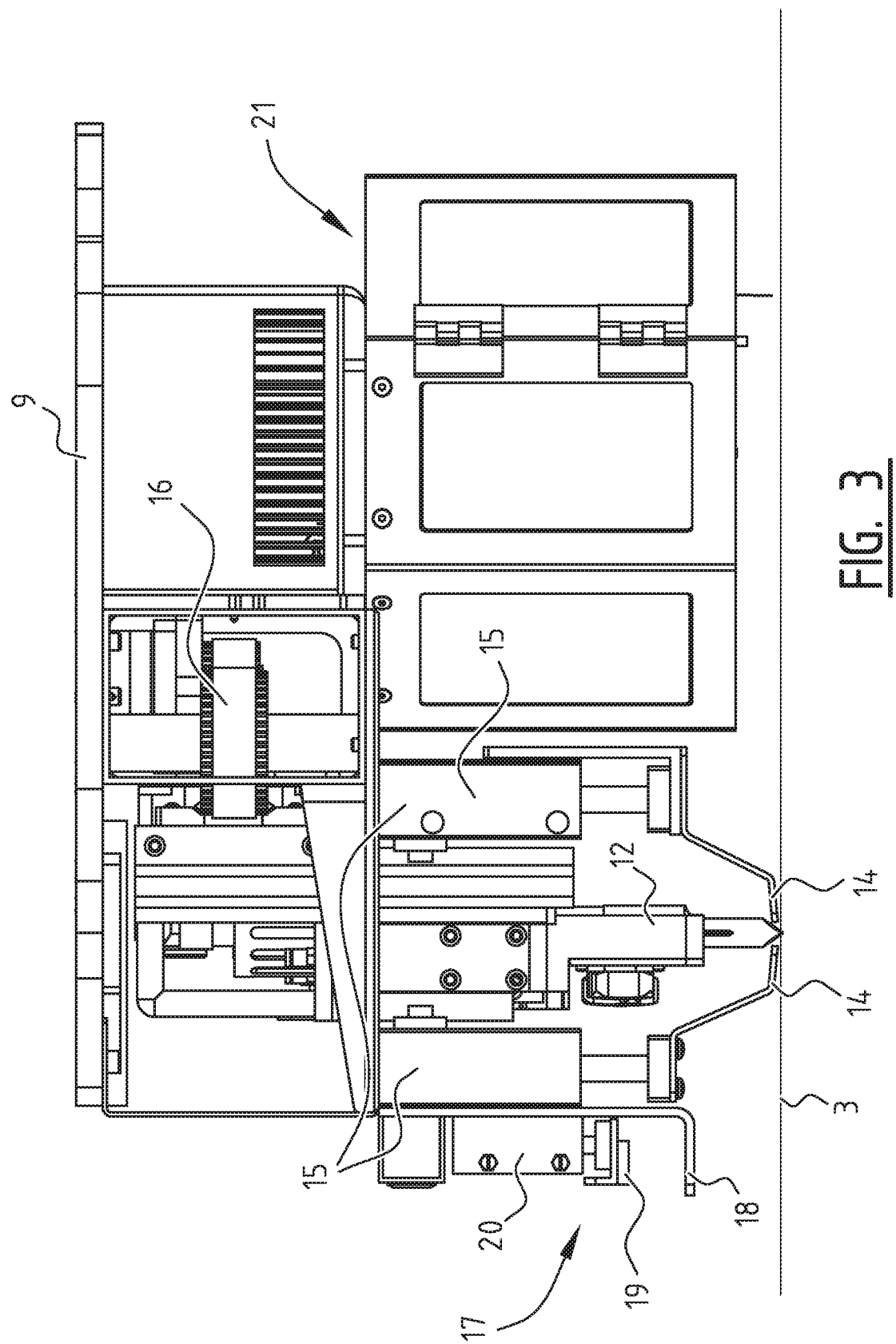
FIG. 3 is a cross-sectional view according to the arrow III in FIG. 1.
Figure 4:
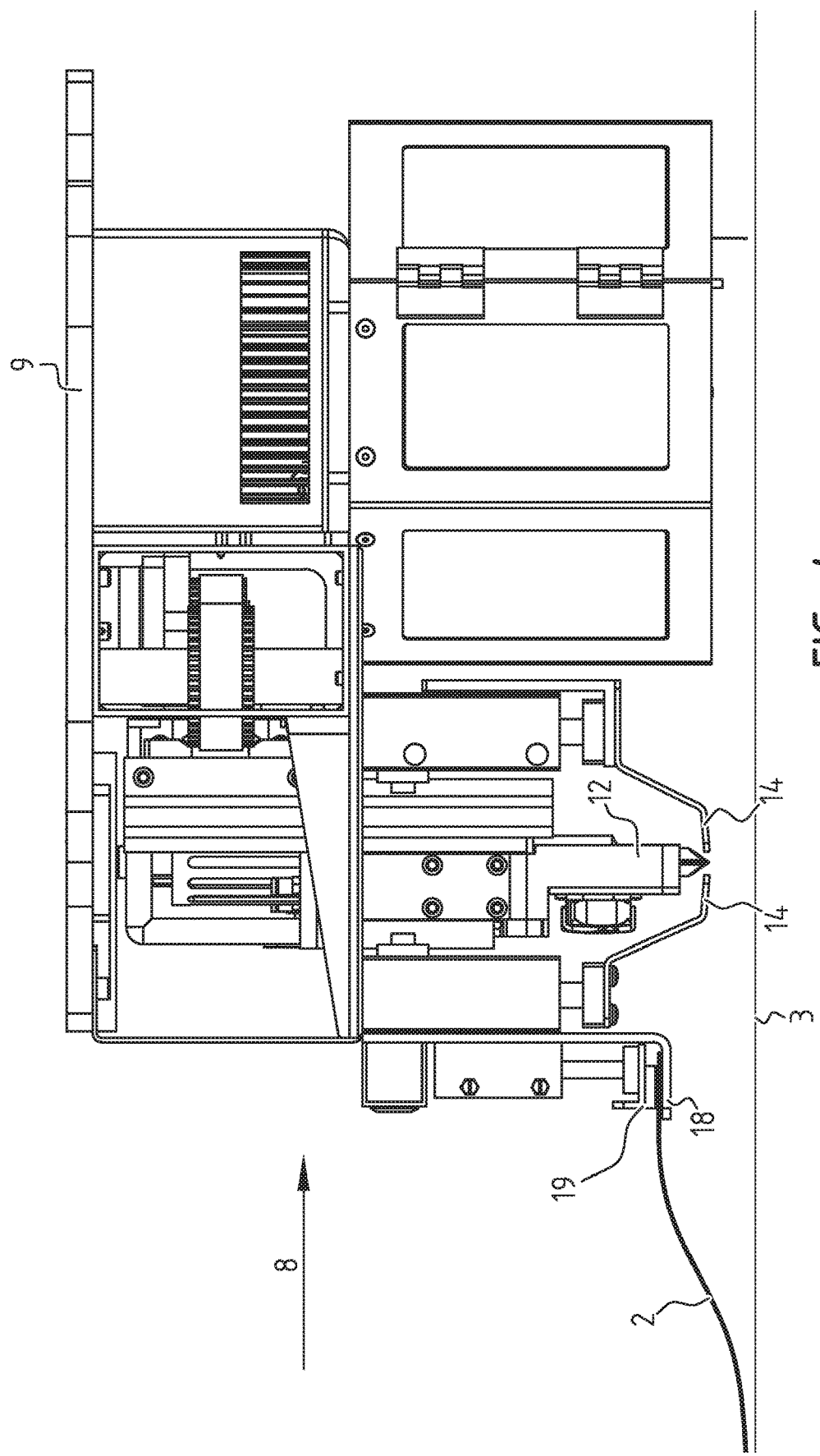
FIG. 4 is a view corresponding to FIG. 3, but wherein a flexible sheet is drawn onto a worktop from a feed roll.

FIGS. 1 and 2 show a device 1 for cutting a flexible sheet 2, for example a fabric, and a ferromagnetic cutting surface 3 onto which the sheet is drawn from a feed roll 4. The cutting surface 3 is made of steel, for example, and forms the tabletop of a cutting table 5 in the figure. The cutting surface 3 may also be a plate, however, which can be detachably or fixedly placed on any existing cutting table and/or any existing cutting surface. The cutting table 5 is provided with upright edges 6, which extend in the longitudinal direction of the cutting surface 3 on opposite sides of the cutting surface 3. Supported on the upright edges 6 is a movable cross beam or bridge 7, which can move forward and backward in the longitudinal direction of the cutting surface 3, as indicated by the arrows 8, over at least part of the cutting surface 3. As shown in FIG. 1, an arm 9 is mounted to the bridge 7, which arm extends parallel to the cutting surface 3. The arm 9 can be rotated 360°, as indicated by the arrows 10, about an axis that extends perpendicular to the cutting surface 3. The arm 9 can furthermore be moved forward and backward, as indicated by the arrows 11, in the longitudinal direction of the bridge 7. Mounted to the arm 9 is a cutting element 12, which can be moved forward and backward in the longitudinal direction of the arm 9, as indicated by the arrows 13. The cutting element 12 is fitted with pressure cutting means of varying sharpness, yet to be described hereinafter, which can be selected as desired, an ultrasonic frequency pulsed cutting means, and a laser cutting means. The movement of the bridge 7, the arm 9 and the cutting element 12 is effected by means of independently driven electric motors (not shown), but instead thereof it is also possible to effect said movement by other means, for example pneumatic or hydraulic means. With reference to FIGS. 3 and 4, a clamping section 14 is mounted to the side of the arm 9 that faces the cutting surface 3 for clamping the flexible sheet 2 between the cutting surface 3 and the clamping section 14. As shown, the clamping section 14 extends on either side of the cutting element 12, along the length of the arm 9 and perpendicular to the cutting surface 3. The flexible sheet 2 is thus pressed against the cutting surface 3 in the direct vicinity of the cutting element 12, so that the flexible sheet 2 can be precisely cut without locally warping. The clamping section 14 is movable between an extended position (FIG. 3), in which the flexible sheet 2 is clamped between the clamping section 14 and the cutting surface 3, being ready for cutting, and a retracted position (FIG. 4) in which the flexible sheet 2 can be laid on the cutting surface 3. In this preferred variant, use is made of a hydraulic drive mechanism 15 for moving the clamping section 14 between the extended position and the retracted position. The cutting element 12 is movable between an extended position (FIG. 3) and a retracted position (FIG. 4), which positions corresponds to the extended position and the retracted position, respectively, of the clamping section 14. The driving mechanism for the cutting element 12 is indicated at 16. The arm 9 is also provided with a clamping section 17 for gripping a free edge of the flexible sheet 2 from the feed roll 4 and subsequently drawing the flexible sheet 2 onto the cutting surface 3 (FIGS. 2 and 4), wherein the bridge 7 moves in the longitudinal direction of the cutting surface 3. The clamping section 17 comprises a section part 18 that is fixedly connected to the arm 9 and a section part 19, which can move forward and backward in a direction perpendicular to the cutting surface 3 relative to the arm 9, for clamping the flexible sheet 2 between the section parts 18, 19. The driving mechanism for the section part 19 is indicated at numeral 20. To conclude, the arm 9 is provided with an inkjet unit 21 for marking off positions and/or patterns on the flexible sheet 2.

Figure 5:
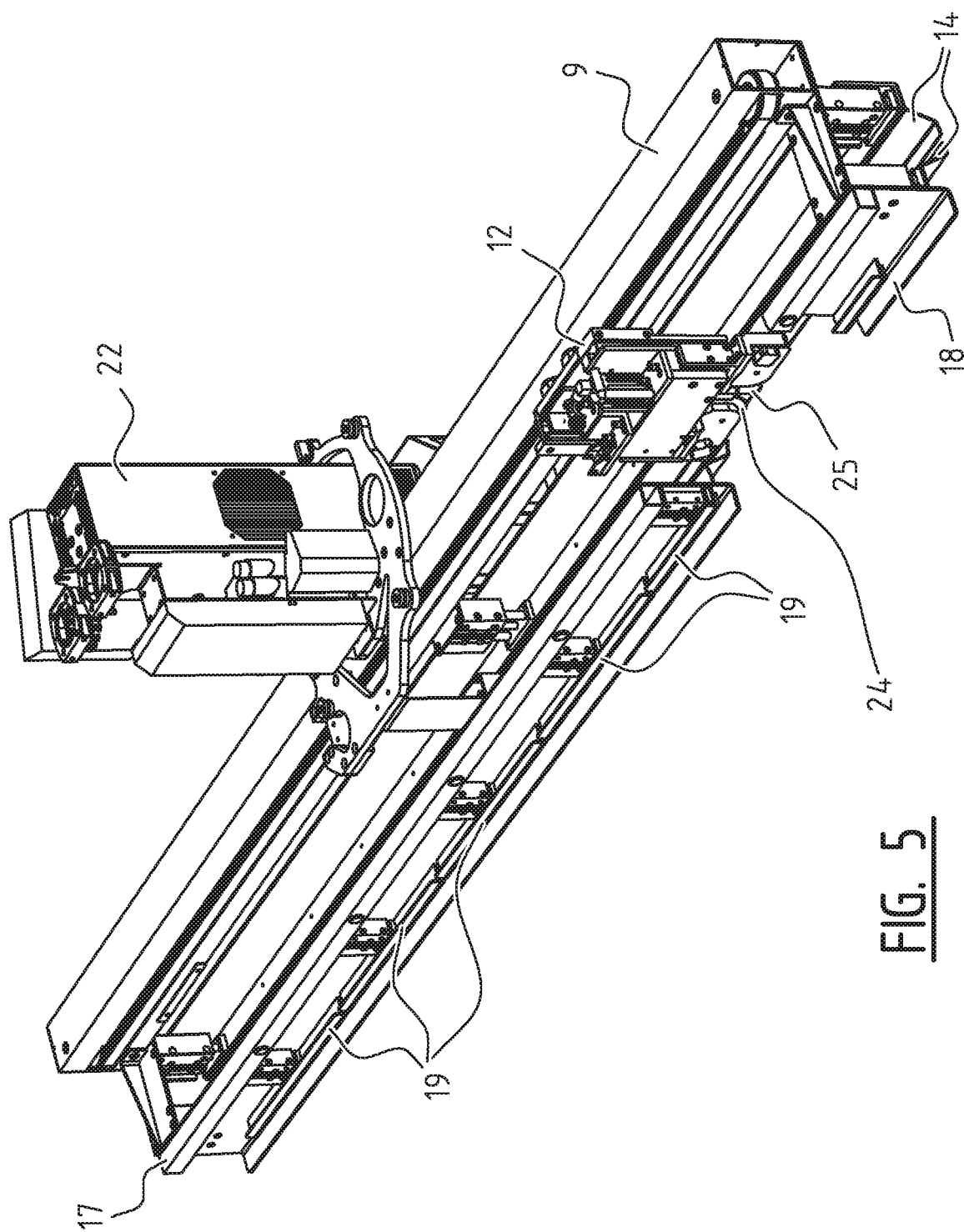
FIG. 5 is a schematic, perspective view of a rotatable arm used in the device of FIG. 1.

The rotatable arm 9 is shown again in perspective view in FIG. 5, in which corresponding parts are indicated by the same reference numerals. The driving mechanism for moving the arm 9 forward and backward in the longitudinal direction of the bridge 7 is indicated at 22.

Calculating the positions of the cutting element 12 on the sheet 2 on the cutting surface 3 takes place by means of a computer (not shown). The shape and/or straight-line to be cut is input into this computer, taking into account a few parameters such as, for example, the tangential fillet angle of the cutting lines. After said calculation, the cutting element 12 is placed on the flexible sheet 2 on the cutting surface 3, as described in the foregoing. Following this, the bridge 7, the arm 12 and the cutting element 12 will move over the cutting surface 3 in the manner calculated by the computer on the basis of the shape and/or straight line input into the computer, wherein the desired shape and/or line will be cut from the flexible sheet 2 by the cutting element 12.

FIGS. 6A-6D show various positions of the cutting element 12, with FIG. 6A showing pressure cutting means 23, 24 of varying sharpness as well as a laser cutting means 25 in a downward (active) position), FIG. 6B showing the laser cutting means 25 in the downward (active) position and the pressure cutting means 23, 24 in the upward (passive) position, FIG. 6C showing one pressure cutting means 23 in a downward (active) position and the other cutting means 24, 25 in an upward (passive position, and FIG. 6D showing the other cutting means 24 in a downward (active) position and the other cutting means 23, 25 in an upward (passive) position. The cutting means 23, 24, 25 in the cutting element 12 can thus be moved to a downward (active) position or an upward (passive) position independently of each other.

It is noted that the invention is not limited to the embodiment as discussed in the foregoing, but that it also extends to other preferred variants that fall within the scope of the appended claims. Thus it will be apparent to the skilled person that the clamping section 14 and the clamping section 17 need not necessarily be used in combination with each other and that the cutting element 12 need not necessarily comprise a combination of cutting means. The skilled person will further appreciate that the invention is not limited to ferromagnetic materials for the cutting surface 3, but that the invention also extends to cutting surfaces made of other materials, for example composites or ceramic materials.

The invention claimed is:

1. A device for processing a flexible sheet, comprising:
a worktop for placement thereon of a flexible sheet to be processed,
a cutter provided above the worktop, and
a cross-beam for positioning the cutter on the flexible sheet and moving it along a straight processing line in a plane of the flexible sheet,
wherein the device further comprises a rotatable arm for setting an orientation of the straight processing line as desired; and
wherein the rotatable arm is coupled to the cutter for moving the cutter in the longitudinal direction of the arm, and wherein the arm extends in a plane substantially parallel to an upper surface of the worktop and is rotatable about an axis that extends substantially perpendicular thereto.

2. The device according to claim 1, wherein the rotatable arm can be rotated 360°.

3. The device according to claim 1, wherein the worktop has a longitudinal axis and a transverse axis, wherein the cross-beam can be moved forward and backward in the longitudinal direction of the worktop over at least part thereof, and wherein the arm can be moved forward and backward in the longitudinal direction of the cross beam.

4. The device according to claim 1, wherein the cutter comprises several cutters to be selected as desired, the cutters selected from the list consisting of cutters of varying sharpness, an ultrasonic frequency pulsed cutter and a laser cutter.

5. The device according to claim 1, wherein at least the upper surface of the worktop comprises at least one of (1) a suction source and (2) is made of hardened steel.

6. The device according to claim 1, further comprising a clamp provided on an arm for gripping the flexible sheet and subsequently placing the flexible sheet on the worktop using the cross-beam.

7. The device according to claim 1, further comprising a touch screen for operating the device.

8. The device according to claim 1, wherein a clamp is provided on a side of the arm that faces an upper surface of the worktop for clamping the flexible sheet between said upper surface of the worktop and the clamp.

9. The device according to claim 8, wherein the clamp comprises a clamping section extending along substantially an entire length of the arm, on either side of the cutter, which the clamp is movable in a direction substantially perpendicular to the upper surface of the worktop.

10. The device according to claim 1, further comprising a marker for drawing at least one of (1) position marks and (2) patterns on the flexible sheet.

11. The device according to claim 10, wherein the marker comprises a cartridge with ink that lights up in ultraviolet light.

12. A method for processing a flexible sheet, comprising:
placing a flexible sheet on a worktop;
providing a cutter;
positioning the cutter on the flexible sheet;
processing the flexible sheet along a straight processing line in a plane of the flexible sheet using the cutter;
setting the orientation of the processing line as desired; and
clamping the flexible sheet between the upper surface of the worktop and a clamp provided on the cutter.

13. The method according to claim 12, wherein the processing of the flexible sheet comprises cutting the flexible sheet.

14. The method according to claim 12, further comprising at least one of:
  gripping the flexible sheet and subsequently placing it on the worktop; and
  drawing position marks and/or patterns on the flexible sheet.

* * * * *